(12) United States Patent
Xu et al.

(10) Patent No.: US 12,206,842 B2
(45) Date of Patent: *Jan. 21, 2025

(54) MOTION FIELD ESTIMATION BASED ON MOTION TRAJECTORY DERIVATION

(71) Applicant: GOOGLE LLC, Mountain View, CA (US)

(72) Inventors: Yaowu Xu, Saratoga, CA (US); Bohan Li, Santa Clara, CA (US); Jingning Han, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,445

(22) Filed: Jan. 26, 2024

(65) Prior Publication Data

US 2024/0171733 A1     May 23, 2024

Related U.S. Application Data

(63) Continuation of application No. 17/090,094, filed on Nov. 5, 2020, now Pat. No. 11,917,128, which is a
(Continued)

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/172* (2014.11); *H04N 19/573* (2014.11)

(58) Field of Classification Search
CPC .. H04N 19/105; H04N 19/139; H04N 19/172; H04N 19/573
See application file for complete search history.

(56) References Cited

U.S. PATENT DOCUMENTS

| 6,097,854 A | 8/2000 | Szeliski et al. |
| RE39,279 E | 9/2006 | Yukitake et al. |

(Continued)

FOREIGN PATENT DOCUMENTS

| JP | 2014511054 A | 5/2014 |
| WO | 2017/133661 A1 | 8/2017 |

OTHER PUBLICATIONS

Bankoski et al., "VP8 Data Format and Decoding Guide", Independent Submission RFC 6389, Nov. 2011, 305 pp.
(Continued)

*Primary Examiner* — Kathleen V Nguyen
(74) *Attorney, Agent, or Firm* — Young Basile Hanlon & MacFarlane, P.C.

(57) ABSTRACT

A motion field estimate determined using motion vector information of two or more reference frames of a current/encoded frame is used to derive a motion vector for inter-prediction of the current/encoded frame. Motion trajectory information, including concatenated motion vectors and locations of the current/encoded frame at which those concatenated motion vectors point, is determined by concatenating motion vectors of the reference frames. A motion field estimate is determined using the motion trajectory information and, in some cases, by interpolating unavailable motion vectors using neighbors. The motion field estimate is used to determine a co-located reference frame for the current/encoded frame, and an inter-prediction process is performed for the current/encoded frame using a motion vector derived using the co-located reference frame. During decoding, the motion field estimate may be determined using motion vectors signaled within a bitstream and without additional side information, thereby improving prediction coding efficiency.

20 Claims, 12 Drawing Sheets

Related U.S. Application Data continuation-in-part of application No. 15/683,684, filed on Aug. 22, 2017, now Pat. No. 11,284,107.

(51) Int. Cl.
*H04N 19/172* (2014.01)
*H04N 19/573* (2014.01)

(56) References Cited

U.S. PATENT DOCUMENTS

| | | | |
|---|---|---|---|
| 8,184,200 | B1 | 5/2012 | Biswas et al. |
| 11,876,974 | B2 | 1/2024 | Xu et al. |
| 2004/0252759 | A1 | 12/2004 | John Winder et al. |
| 2006/0233253 | A1 | 10/2006 | Shi et al. |
| 2008/0204592 | A1 | 8/2008 | Jia et al. |
| 2009/0148058 | A1* | 6/2009 | Dane .................. H04N 19/154 382/251 |
| 2011/0149106 | A1 | 6/2011 | Kino |
| 2011/0249734 | A1 | 10/2011 | Segall et al. |
| 2012/0237114 | A1 | 9/2012 | Park et al. |
| 2013/0070856 | A1 | 3/2013 | Sato |
| 2013/0114002 | A1 | 5/2013 | Carlsson et al. |
| 2013/0121416 | A1 | 5/2013 | He et al. |
| 2014/0037982 | A1 | 2/2014 | Ivanov et al. |
| 2014/0307982 | A1 | 10/2014 | Kanaev et al. |
| 2015/0078456 | A1 | 3/2015 | Hannuksela |
| 2015/0339806 | A1 | 11/2015 | Wu et al. |
| 2016/0286232 | A1* | 9/2016 | Li .......................... H04N 19/52 |
| 2017/0094305 | A1 | 3/2017 | Li et al. |
| 2018/0376166 | A1 | 12/2018 | Chuang et al. |
| 2019/0068991 | A1 | 2/2019 | Xu et al. |
| 2020/0029071 | A1 | 1/2020 | Kang et al. |

OTHER PUBLICATIONS

Bankoski et al., "VP8 Data Format and Decoding Guide draft-bankoski-vp8-bitstream-02", Network Working Group, Internet-Draft, May 18, 2011, 288 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

Bankoski, et al., "Technical Overview of VP8, An Open Source Video Codec for the Web", Jul. 11, 2011, 6 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

"VP8 Data Format and Decoding Guide, WebM Project", Google On2, Dec. 1, 2010, 103 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

Sun, Deqing et al.; "Learning Optical Flow"; ECCV 2008, Part III, LNC 5304; pp. 83-97.

International Search Report and Written Opinion in PCT/US2018/032054, mailed Jul. 23, 2018, 14 pgs.

Yi Chin et al., "Dense true motion field compensation for video coding", 2013 IEEE International Conference on Image Processing, IEEE, (Sep. 15, 2013), pp. 1958-1961.

J. Chen et al., "Algorithm description of Joint Exploration Test Model 7 (JEM7)", Joint Video Exploration Team (JVET) of ITU-T SG 16 WP 3 and ISO/IEC JTC1/SC29/WG11, 7th Meeting, Torino, Italy, Jul. 13-21, 2017 (url: http://phenix.int-evry.fr/jvet/, document No. JVET-G1001 (Aug. 19, 2017), 48 pgs.

Alexander Alshin et al., "Bi-directional Optical Flow for Future Video Codec", 2016 Data Compression Conference (DCC), IEEE, Mar. 30, 2016, pp. 83-90.

A. Alshin et al., "Bi-directional optical flow for improving motion compensation", 2010 Picture Coding Symposium (PCS 2010), Nagoya, Japan, Dec. 8-10, 2010 (IEEE, Piscataway, NJ), pp. 422-425.

* cited by examiner

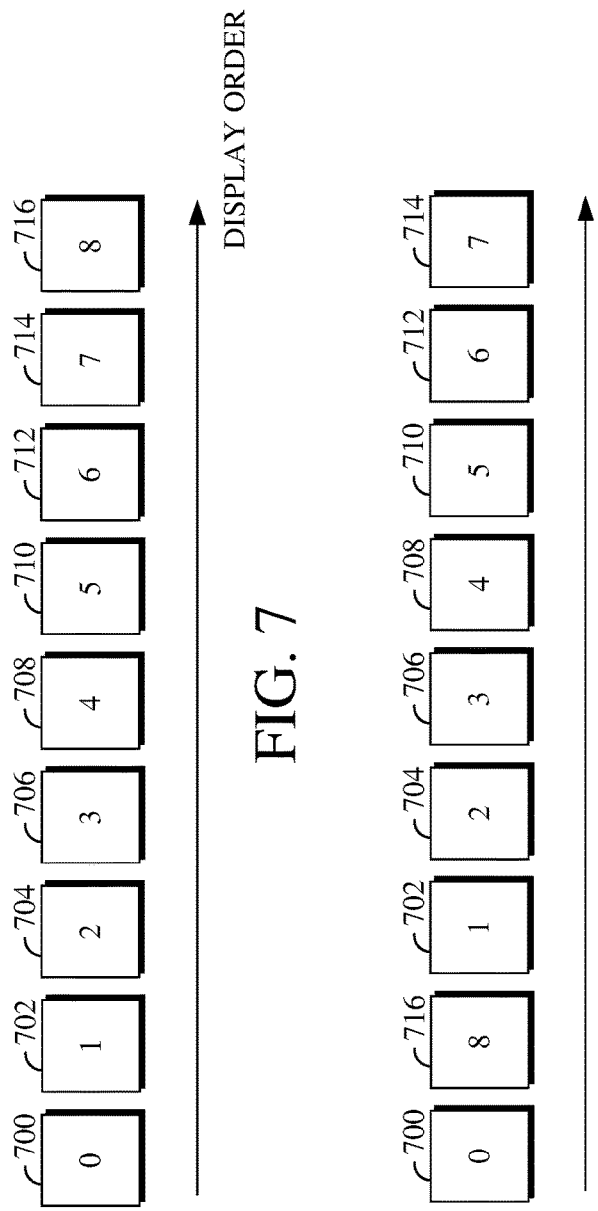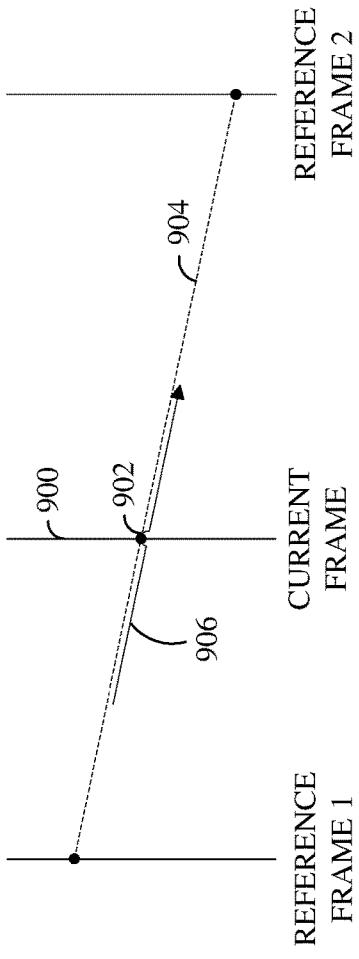
FIG. 7
FIG. 8
FIG. 9

MOTION FIELD ESTIMATION BASED ON MOTION TRAJECTORY DERIVATION

CROSS-REFERENCE TO RELATED APPLICATION(S)

This disclosure is a continuation of U.S. patent application Ser. No. 17/090,094, filed Nov. 5, 2020, which is a continuation-in-part of U.S. patent application Ser. No. 15/683,684, filed Aug. 22, 2017, the disclosures of which are incorporated by reference herein in their entirety.

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission or storage of the video data. Various approaches have been proposed to reduce the amount of data in video streams, including compression and other encoding techniques.

One technique for compression uses a reference frame to generate a prediction block corresponding to a current block to be encoded. Differences between the prediction block and the current block can be encoded, instead of the values of the current block themselves, to reduce the amount of data encoded.

SUMMARY

This disclosure relates generally to encoding and decoding video data and more particularly relates to motion field estimation based on motion trajectory derivation. This disclosure describes encoding and decoding methods and apparatuses.

A method according to an implementation of the disclosure includes reconstructing a first reference frame and a second reference frame using frame data encoded to a bitstream to which an encoded frame is also encoded. Motion trajectory information is determined by concatenating one or more motion vectors of the first reference frame and one or more motion vectors of the second reference frame. A motion field estimate for the encoded frame is determined using the motion trajectory information. A co-located reference frame is determined using the motion field estimate. An inter-prediction process for decoding the encoded frame is then performed using a motion vector derived from the co-located reference frame.

A method according to another implementation of the disclosure includes reconstructing a first reference frame and a second reference frame using frame data encoded to a bitstream to which an encoded frame is also encoded. Motion trajectory information is determined by concatenating motion vectors of the first reference frame and of the second reference frame. A co-located reference frame is determined based on the motion trajectory information. An inter-prediction process for decoding the encoded frame is then performed using a motion vector derived using the co-located reference frame.

A method according to yet another implementation of the disclosure includes reconstructing a first reference frame and a second reference frame using frame data encoded to a bitstream to which an encoded frame is also encoded. A motion field estimate for the encoded frame is determined using motion vector information associated with the first reference frame and with the second reference frame. A co-located reference frame is determined using the motion field estimate. An inter-prediction process for decoding the encoded frame is then performed using a motion vector derived using the co-located reference frame.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below wherein like reference numerals refer to like parts throughout the several views unless otherwise noted.

FIG. 7 is a diagram of a group of frames in a display order of a video sequence.

FIG. 8 is a diagram of an example of a coding order for the group of frames of FIG. 7.

FIG. 9 is a diagram used to explain the linear projection of a motion field according to the teachings herein.

DETAILED DESCRIPTION

Figure 1:
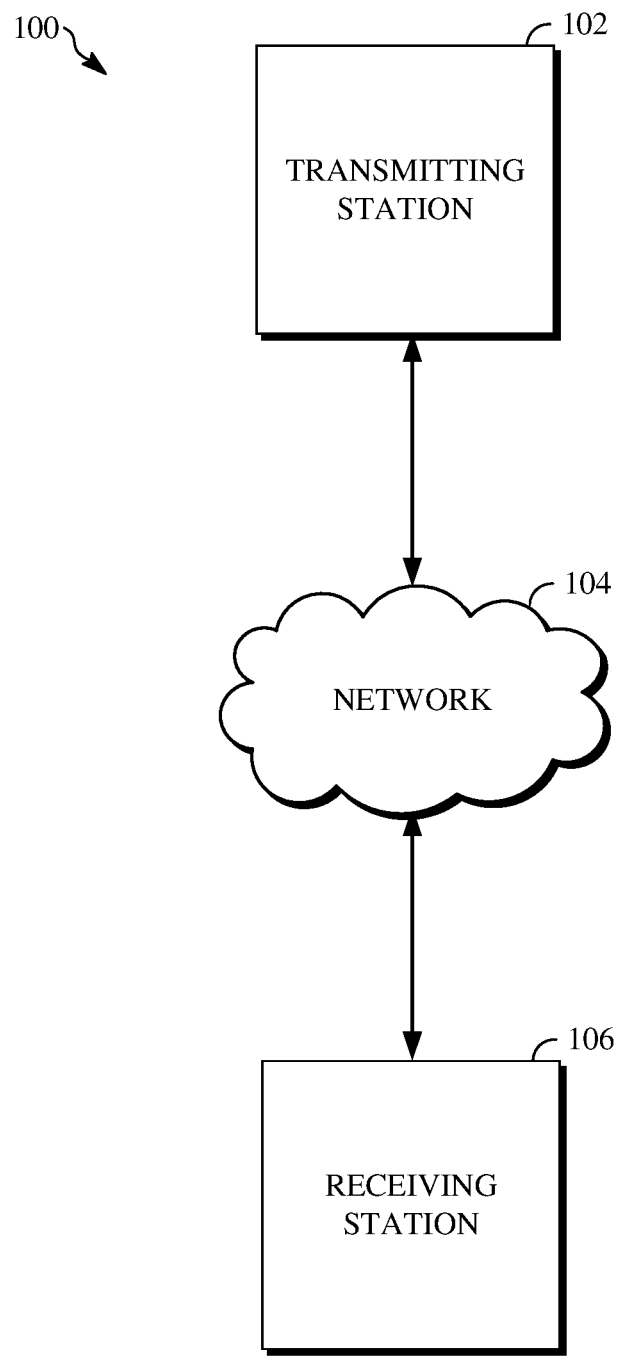
FIG. 1 is a schematic of a video encoding and decoding system.

A video stream can be compressed by a variety of techniques to reduce bandwidth required transmit or store the video stream. A video stream can be encoded into a bitstream, which involves compression, which is then transmitted to a decoder that can decode or decompress the video stream to prepare it for viewing or further processing. Compression of the video stream often exploits spatial and temporal correlation of video signals through spatial and/or motion compensated prediction. Inter-prediction, for example, uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block. Inter-prediction may also be referred to as motion compensated prediction.

Each motion vector used to generate a prediction block in the inter-prediction process refers to a frame other than a current frame, i.e., a reference frame. Reference frames can be located before or after the current frame in the sequence of the video stream, and may be frames that are reconstructed before being used as a reference frame. In some cases, there may be three reference frames used to encode or decode blocks of the current frame of the video sequence. One is a frame that may be referred to as a golden frame. Another is a most recently encoded or decoded frame. The last is an alternative reference frame that is encoded or decoded before one or more frames in a sequence, but which is displayed after those frames in an output display order. In this way, the alternative reference frame is a reference frame usable for backwards prediction. One or more forward and/or backward reference frames can be used to encode or decode a bock. The efficacy of a reference frame when used to encode or decode a block within a current frame can be measured based on a resulting signal-to-noise ratio or other measures of rate-distortion.

In this technique, the pixels that form prediction blocks are obtained directly from one or more of the available reference frames. The reference pixel blocks or their linear combinations are used as prediction for the given coding block in the current frame. This direct, block-based prediction does not capture the true motion activity available from the reference frames. For this reason, motion compensated prediction accuracy can suffer.

With the hierarchical coding structure typically used in video coding, certain motion information is available to encoder or decoder, but not exploited in ways which could improve the efficiency of the encoder or decoder. For example, motion vectors are conventionally used only in connection with the processing of a block or frame with which the motion vector is associated. The implementations of this disclosure address problems such as these, in particular, by using motion vectors of previously reconstructed frames may to determine a motion field estimation of a current or encoded frame.

In one approach, to more fully utilize motion information from available bi-directional reference frames (e.g., one or more forward and one or more backward reference frames), a reference frame co-located with a current frame that uses a per-pixel motion field generated using a motion field estimation representative of the true motion activities in the video signal may be used. In this way, a co-located frame that allows tracking of complicated non-translational motion activity may be interpolated, which is beyond the capability of conventional block based motion compensated prediction directly from reference frames. Use of such a reference frame can improve prediction quality.

In another approach, a motion field estimation of a current frame to be encoded or an encoded frame to be decoded may be determined using motion information available to the encoder or decoder and without additional side information. For example, a motion field estimate may be determined by deriving a motion trajectory from one or more available motion vectors, for example, by concatenating such motion vectors to form the motion trajectory. The motion field estimate can then be used in one or more ways to improve coding efficiency. For example, the motion field estimate can be used for motion vector prediction, co-located reference frame interpolation, and/or other purposes. The implementations of this disclosure thus describe approaches which use motion information available to an encoder or to a decoder to improve prediction efficiency.

Further details of motion field estimation based on motion trajectory derivation are described herein with initial reference to a system in which the teachings herein can be implemented. FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
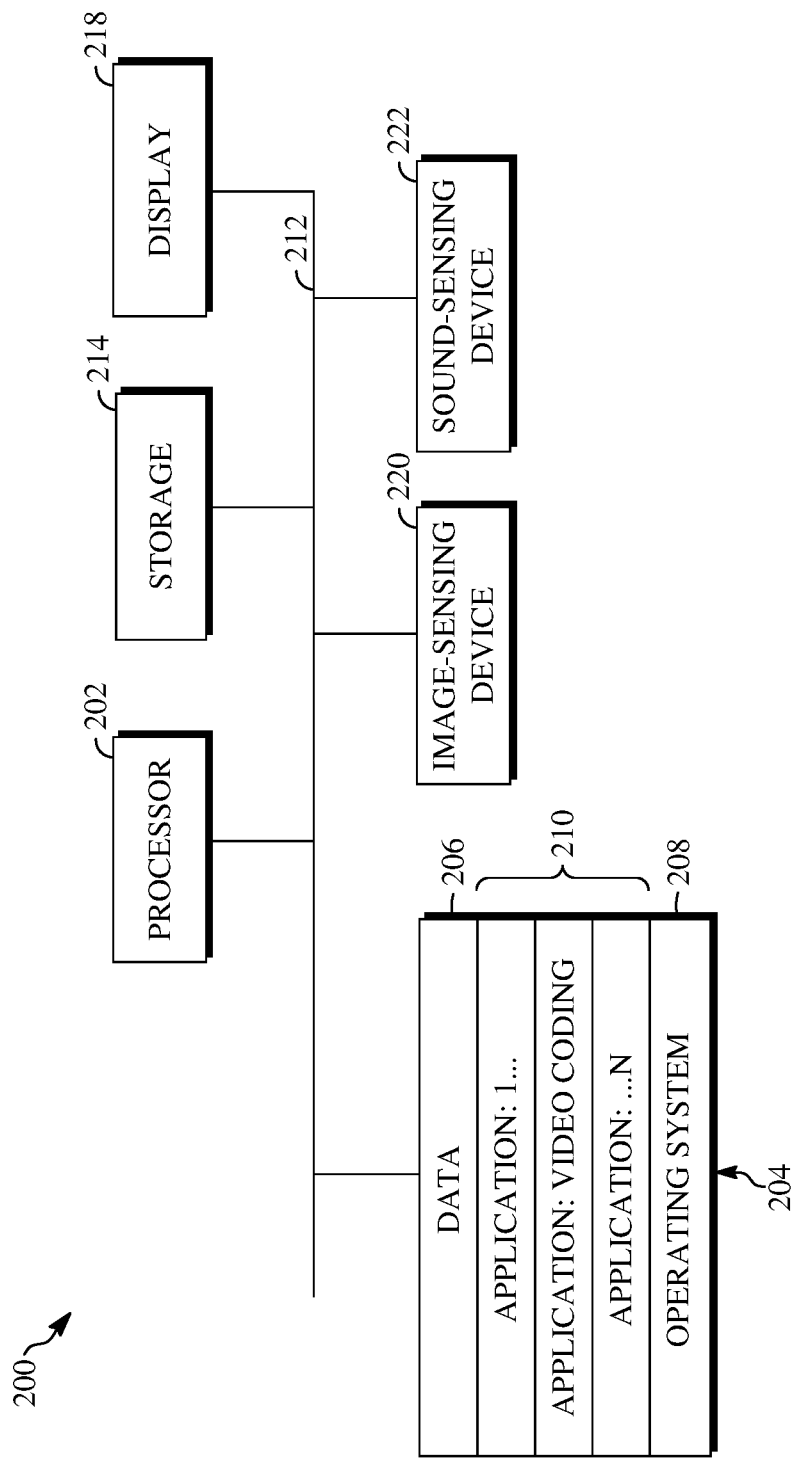
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having a non-transitory storage medium or memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext Transfer Protocol (HTTP) based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a central processing unit. Alternatively, the CPU 202 can be any other type of device, or multiple devices, capable of manipulating or processing information now-existing or hereafter developed. Although the disclosed implementations can be practiced with one processor as shown, e.g., the CPU 202, advantages in speed and efficiency can be achieved using more than one processor.

A memory 204 in computing device 200 can be a read only memory (ROM) device or a random access memory (RAM) device in an implementation. Any other suitable type of storage device or non-transitory storage medium can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more of processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
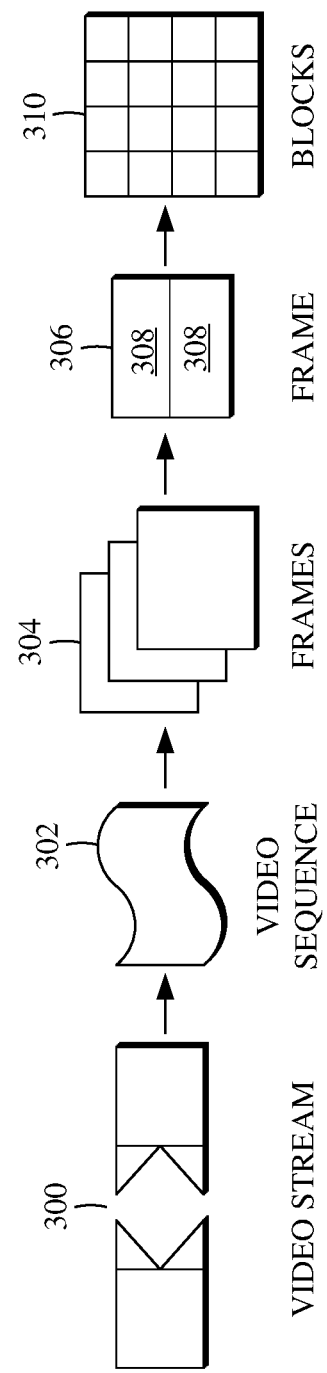
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
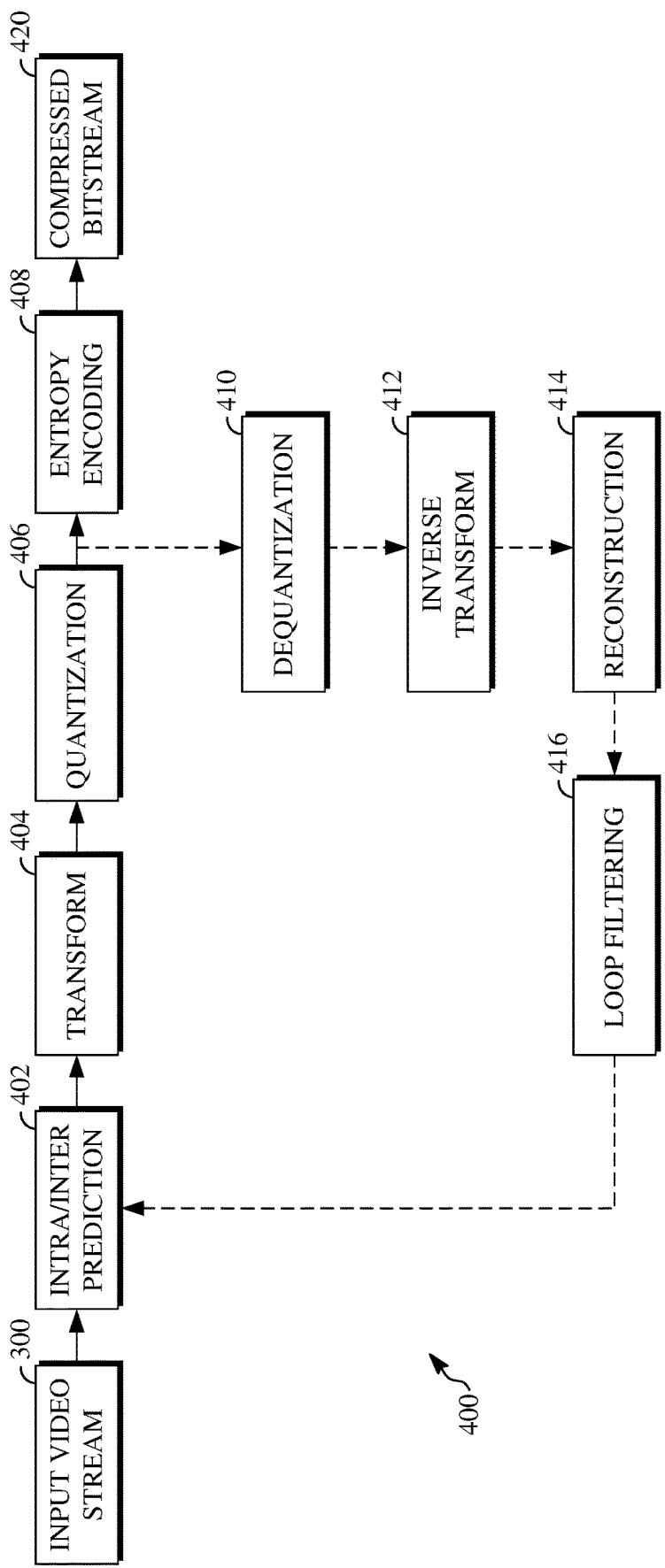
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. The designation of reference frames for groups of blocks is discussed in further detail below.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block, which may include for example the type of prediction used, transform type, motion vectors and quantizer value, are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
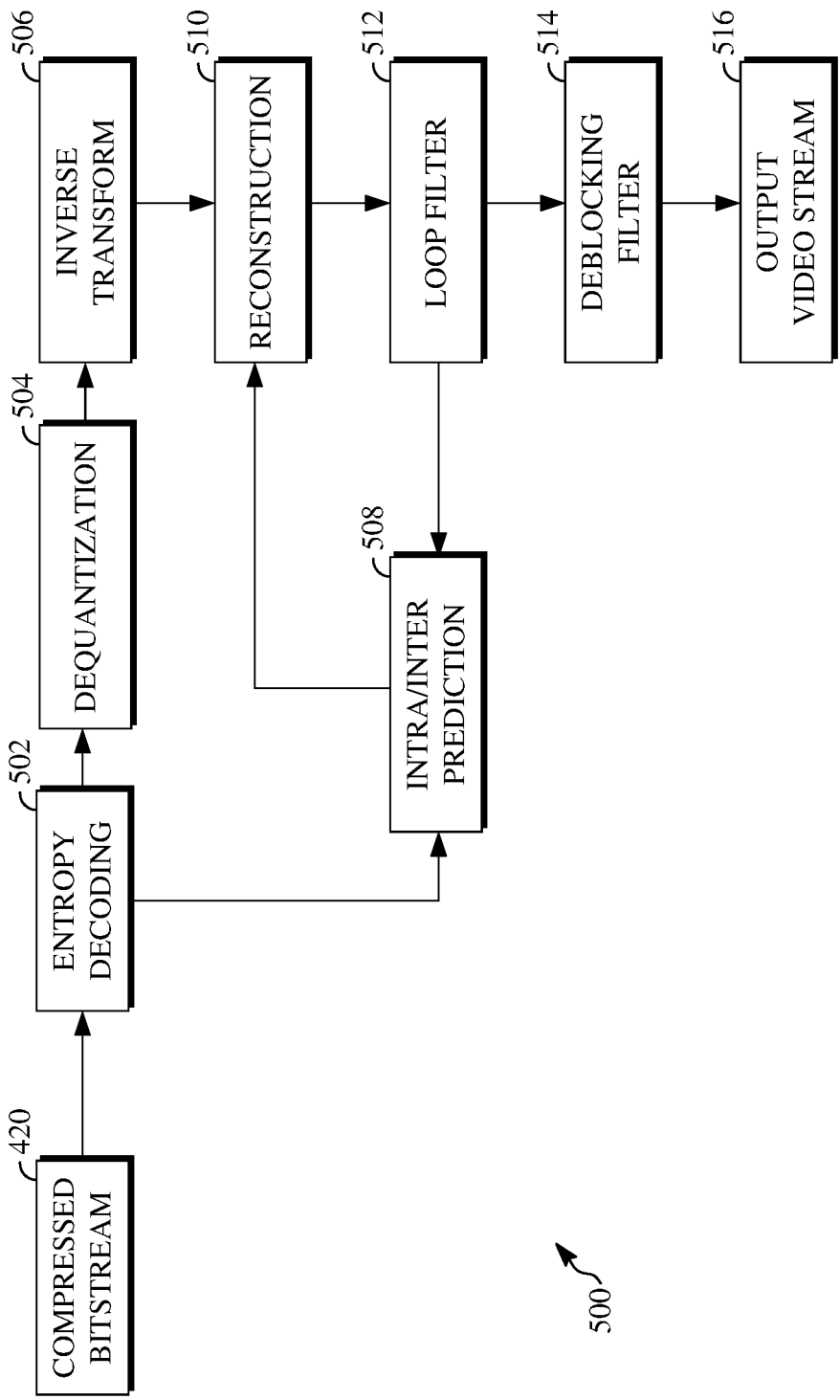
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
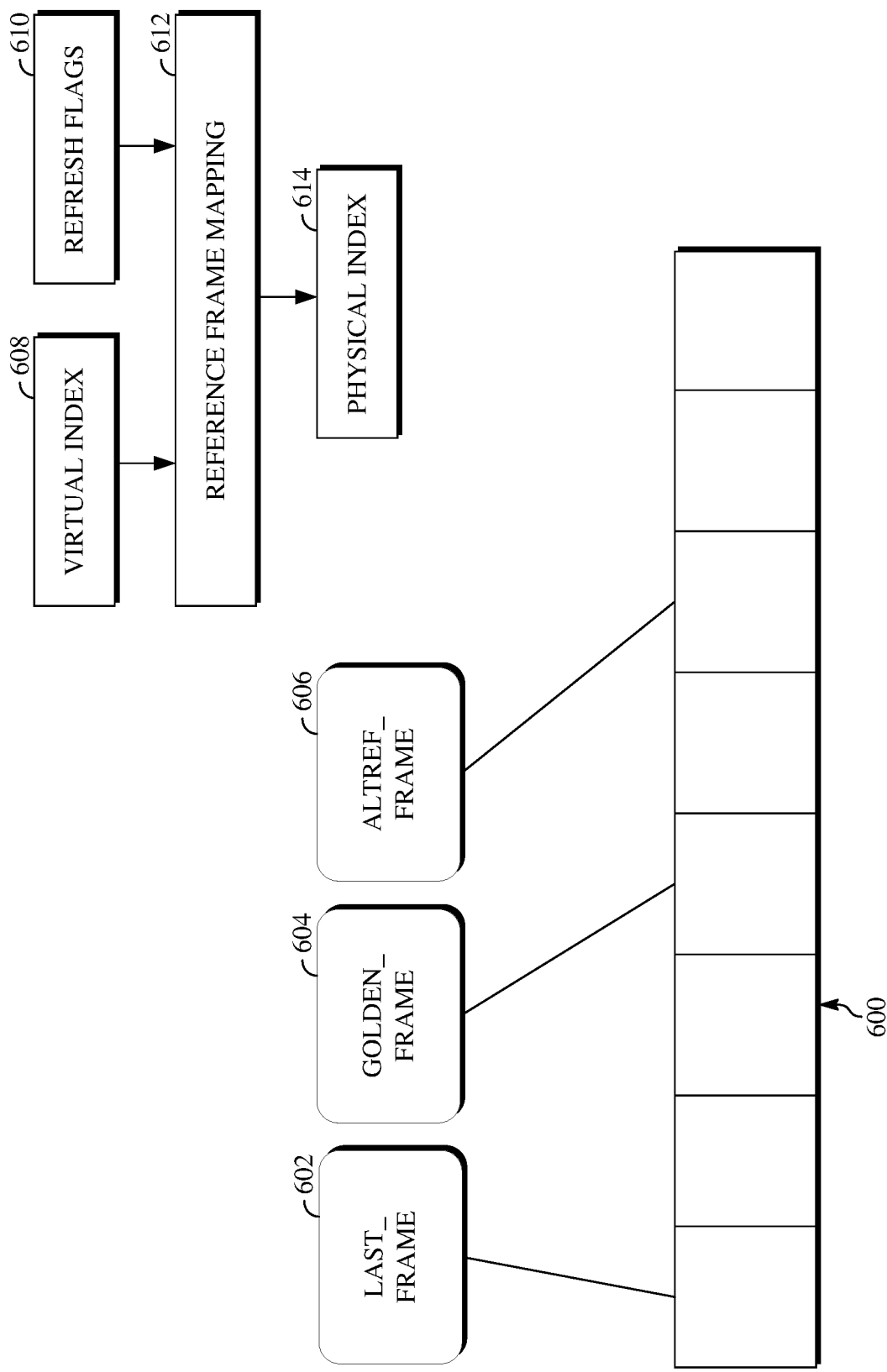
FIG. 6 is a block diagram of an example of a reference frame buffer.

FIG. 6 is a block diagram of an example of a reference frame buffer 600. The reference frame buffer 600 stores reference frames used to encode or decode blocks of frames of a video sequence. In this example, the reference frame buffer 600 includes reference frames identified as a last frame LAST_FRAME 602, a golden frame GOLDEN_FRAME 604, and an alternative reference frame ALTREF_FRAME 606. The frame header of a reference frame includes a virtual index 608 to a location within the reference frame buffer 600 at which the reference frame is stored. A reference frame mapping 612 maps the virtual index 608 of a reference frame to a physical index 614 of memory at which the reference frame is stored. Where two reference frames are the same frame, those reference frames will have the same physical index even if they have different virtual indexes. One or more refresh flags 610 can be used to remove one or more of the stored reference frames from the reference frame buffer 600, for example, to clear space in the reference frame buffer 600 for new reference frames, where there are no further blocks to encode or decode using the stored reference frames, or where a new frame is encoded or decoded and identified as a reference frame. The number of reference positions within the reference frame buffer 600, the types, and the names used are examples only.

The reference frames stored in the reference frame buffer 600 can be used to identify motion vectors for predicting blocks of frames to be encoded or decoded. Different reference frames may be used depending on the type of prediction used to predict a current block of a current frame. For example, in bi-prediction, blocks of the current frame can be forward predicted using either frames stored as the LAST_FRAME 602 or the GOLDEN_FRAME 604, and backward predicted using a frame stored as the ALTREF_FRAME 606.

There may be a finite number of reference frames that can be stored within the reference frame buffer 600. As shown in FIG. 6, the reference frame buffer 600 can store up to eight reference frames, wherein each stored reference frame may be associated with a different virtual index 602 of the reference frame buffer. Although three of the eight spaces in the reference frame buffer 600 are used by frames designated as the LAST_FRAME 602, the GOLDEN_FRAME 604, and the ALTREF_FRAME 606, five spaces remain available to store other reference frames. For example, one or more available spaces in the reference frame buffer 600 may be used to store further alternative reference frames, in particular the interpolated reference frame described herein.

In some implementations, the alternative reference frame designated as the ALTREF_FRAME 606 may be a frame of a video sequence that is distant from a current frame in a display order, but is encoded or decoded earlier than it is displayed. For example, the alternative reference frame may be ten, twelve, or more (or fewer) frames after the current frame in a display order. Further alternative reference frames can be frames located nearer to the current frame in the display order.

An alternative reference frame may not correspond directly to a frame in the sequence. Instead, the alternative reference frame may be generated using one or more of the frames having filtering applied, being combined together, or being both combined together and filtered. An alternative reference frame may not be displayed. Instead, it can be a frame or portion of a frame generated and transmitted for use only for prediction (i.e., it is omitted when the decoded sequence is displayed).

Although the reference frame buffer 600 is shown as being able to store up to eight reference frames, other implementations of the reference frame buffer 600 may be able to store additional or fewer reference frames. Furthermore, the available spaces in the reference frame buffer 600 may be used to store frames other than alternative reference frames. For example, the available spaces may store a second last frame (i.e., the first frame before the last frame) and/or a third last frame (i.e., a frame two frames before the last frame) as additional forward prediction reference frames. In some examples, a backward frame may be stored as an additional backward prediction reference frame.

FIG. 7 is a diagram of a group of frames in a display order of the video sequence. In this example, the group of frames is preceded by a frame 700, which can be referred to as a key frame or an overlay frame in some cases, and comprises eight frames 702-716. No block within the frame 700 is inter predicted using reference frames of the group of frames. The frame 700 is a key (also referred to as intra-predicted frame) in this example, which refers to its status that predicted blocks within the frame are only predicted using intra prediction. However, the frame 700 can be an overlay frame, which is an inter-predicted frame that can be a reconstructed frame of a previous group of frames. In an inter-predicted frame, at least some of the predicted blocks are predicted using inter prediction. The number of frames forming each group of frames can vary according to the video spatial/temporal characteristics and other encoded configurations, such as the key frame interval selected for random access or error resilience, for example.

The coding order for each group of frames can differ from the display order. This allows a frame located after a current frame in the video sequence to be used as a reference frame for encoding the current frame. A decoder, such as the decoder 500, may share a common group coding structure with an encoder, such as the encoder 400. The group coding structure assigns different roles that respective frames within the group may play in the reference buffer (e.g., a last frame, an alternative reference frame, etc.) and defines or indicates the coding order for the frames within a group.

FIG. 8 is a diagram of an example of a coding order for the group of frames of FIG. 7. The coding order of FIG. 8 is associated with a first group coding structure whereby a single backward reference frame is available for each frame of the group. Because the encoding and decoding order is the same, the order shown in FIG. 8 is generally referred to herein as a coding order. The key or overlay frame 700 is designated the golden frame in a reference frame buffer, such as the GOLDEN_FRAME 604 in the reference frame buffer 600. The frame 700 is intra-predicted in this example, so it does not require a reference frame, but an overlay frame as the frame 700, being a reconstructed frame from a previous group, also does not use a reference frame of the current group of frames. The final frame 716 in the group is designated an alternative reference frame in a reference frame buffer, such as the ALTREF_FRAME 606 in the reference frame buffer 600. In this coding order, the frame 716 is coded out of the display order after the frame 700 so as to provide a backward reference frame for each of the remaining frames 702-714. In coding blocks of the frame 716, the frame 700 serves as an available reference frame for blocks of the frame 716.

FIG. 8 is only one example of a coding order for a group of frames. Other group coding structures may designate one or more different or additional frames for forward and/or backward prediction.

As mentioned briefly above, an available reference frame may be a reference frame that is interpolated using optical flow estimation. The reference frame is referred to as a co-located reference frame herein because the dimensions are the same as the current frame. In some cases, there is no need for a motion search within the co-located reference frame for a current block to be encoded. Instead, the co-located block (i.e., the block having the same pixel dimensions and same address in the co-located reference frame) may be used for inter prediction of the current block. Alternatively, a motion search may be performed to determine a prediction block for a current block. Using optical flow estimation can result in a reference frame that improves the precision of motion compensated prediction for a current frame, and hence improve video compression performance. This interpolated reference frame may also be referred to herein as an optical flow reference frame.

FIG. 9 is a diagram used to explain the linear projection of a motion field according to the teachings herein. Within a hierarchical coding framework, the optical flow (also called a motion field) of the current frame may be estimated using the nearest available reconstructed (e.g., reference) frames before and after the current frame. In FIG. 9, the reference frame 1 is a reference frame that may be used for forward prediction of the current frame 900, while the reference frame 2 is a reference frame that may be used for backward prediction of the current frame 900. Using the example of FIGS. 6-8 for illustration, if the current frame 900 is the frame 706, the immediately preceding, or last, frame 704 (e.g., the reconstructed frame stored in the reference frame buffer 600 as the LAST_FRAME 602) can be used as the reference frame 1, while the frame 716 (e.g., the reconstructed frame stored in the reference frame buffer 600 as the ALTREF_FRAME 606) can be used as the reference frame 2.

Knowing the display indexes of the current and reference frames, motion vectors may be projected between the pixels in the reference frames 1 and 2 to the pixels in the current frame 900 assuming that the motion field is linear in time. In the simple example described with regard to FIGS. 6-8, the index for the current frame 900 is 3, the index for the reference frame 1 is 0, and the index for the reference frame 2 is 716. In FIG. 9, a projected motion vector 904 for a pixel 902 of the current frame 900 is shown. Using the previous example in explanation, the display indexes of the group of frames of FIG. 7 would show that the frame 704 is temporally closer to the frame 706 than the frame 716. Accordingly, the single motion vector 904 shown in FIG. 9 represents a different amount of motion between reference frame 1 and the current frame 900 than between the reference frame 2 and the current frame 900. Nevertheless, the projected motion field 906 is linear between the reference frame 1, the current frame 900, and the reference frame 2.

Selecting the nearest available reconstructed forward and backward reference frames and assuming a motion field for respective pixels of the current frame that is linear in time allows generation of the interpolated reference frame using optical flow estimation to be performed at both an encoder and a decoder (e.g., at the intra/inter prediction stage 402 and the intra/inter prediction stage 508) without transmitting extra information. Instead of the nearest available reconstructed reference frames, it is possible that different frames may be used as designated a priori between the encoder and decoder. In some implementations, identification of the frames used for the optical flow estimation may be transmitted. Generation of the interpolated frame is discussed in more detail below.

Figure 10:
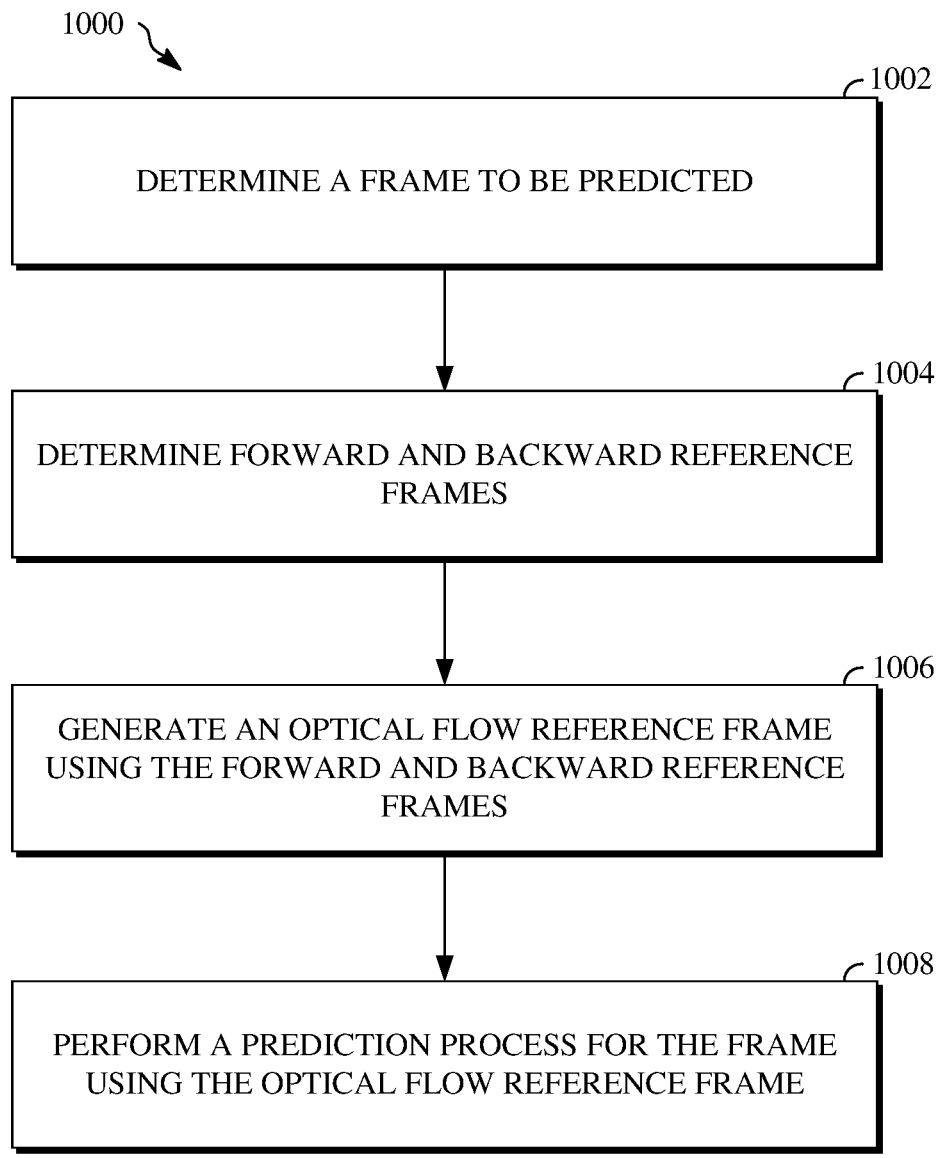
FIG. 10 is a flowchart diagram of a process for motion compensated prediction of a video frame using an optical flow reference frame generated using optical flow estimation.

FIG. 10 is a flowchart diagram of a method or process 1000 for motion compensated prediction of a frame of a video sequence using an optical flow reference frame generated using optical flow estimation. The optical flow reference frame may also be referred to as a co-located reference frame herein. The process 1000 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 1000. The process 1000 can be implemented using specialized hardware or firmware. Some computing devices may have multiple memories or processors, and the operations described in the process 1000 can be distributed using multiple processors, memories, or both.

At 1002, a current frame to be predicted is determined. Frames may be coded, and hence predicted, in any encoder order, such as in the coding order shown in FIG. 8. The frames to be predicted may also be referred to as a first, second, third, etc. frame. The label of first, second, etc. does not indicate an order of the frames, instead the label is used to distinguish one current frame from another herein. At an encoder, the frame is processed in units of blocks in a block coding order, such as a raster scan order. At a decoder, the frame is also processed in units of blocks according to receipt of their encoded residuals within an encoded bitstream.

At 1004, forward and backward reference frames are determined. In the examples described herein, the forward and backward reference frames are the nearest reconstructed frames before and after (e.g., in display order) the current frame, such as the current frame 900. Although not expressly shown in FIG. 10, if either a forward or backward reference frame does not exist, the process 1000 ends. The current frame is then processed without considering an optical flow reference frame.

Provided that forward and backward reference frames exist at 1004, an optical flow reference frame is generated using the reference frames at 1006. Generating the optical flow reference frame is described in more detail with reference to FIGS. 11-13. The optical flow reference frame may be stored at a defined position within the reference frame buffer 600.

At 1008, a prediction process is performed for the current frame using the optical flow reference frame generated at 1006. The prediction process can include generating a prediction block from the optical flow reference frame for predicting a current block of the frame. Generating the prediction block in either an encoder or a decoder can include selecting the co-located block in the optical flow reference frame as the prediction block. In an encoder, generating the prediction block can include performing a motion search within the optical flow reference frame to select the best matching prediction block for the current block. In a decoder, generating the prediction block can include using a motion vector decoded from the encoded bitstream to generate the prediction block using pixels of the optical flow reference frame. However the prediction block is generated at the encoder, the resulting residual can be further processed, such as using the lossy encoding process described with regard to the encoder 400 of FIG. 4. However the prediction block is generated at the decoder, the decoded residual for the current block from the encoded bitstream can be combined with the prediction block to form a reconstructed block as described by example with regard to the decoder 500 of FIG. 5.

At an encoder, the process 1000 may form part of a rate distortion loop for the current block that uses various prediction modes, including one or more intra prediction modes and both single and compound inter prediction modes using the available prediction frames for the current frame. A single inter prediction mode uses only a single forward or backward reference frame for inter prediction. A compound inter prediction mode uses both a forward and a backward reference frame for inter prediction. In a rate distortion loop, the rate (e.g., the number of bits) used to encode the current block using respective prediction modes is compared to the distortion resulting from the encoding. The distortion may be calculated as the differences between pixel values of the block before encoding and after decoding. The differences can be a sum of absolute differences or some other measure that captures the accumulated error for blocks of the frames.

The prediction process at 1008 may be repeated for all blocks of the current frame until the current frame is encoded or decoded.

In some implementations, it may be desirable to limit the use of the optical flow reference frame to the single inter prediction mode. This can simplify the rate distortion loop, and little additional impact on the encoding of a block is expected because the optical flow reference frame already considers both a forward and a backward reference frame.

Figure 12:
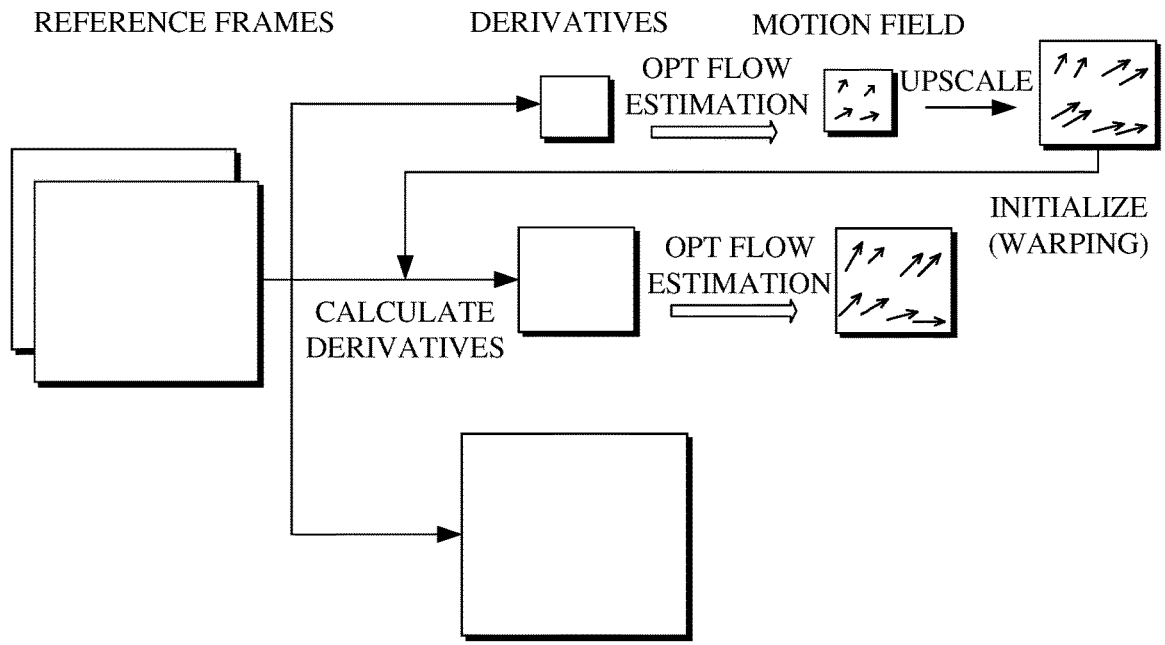
FIG. 12 is a diagram that illustrates the process of FIG. 11.
Figure 13:
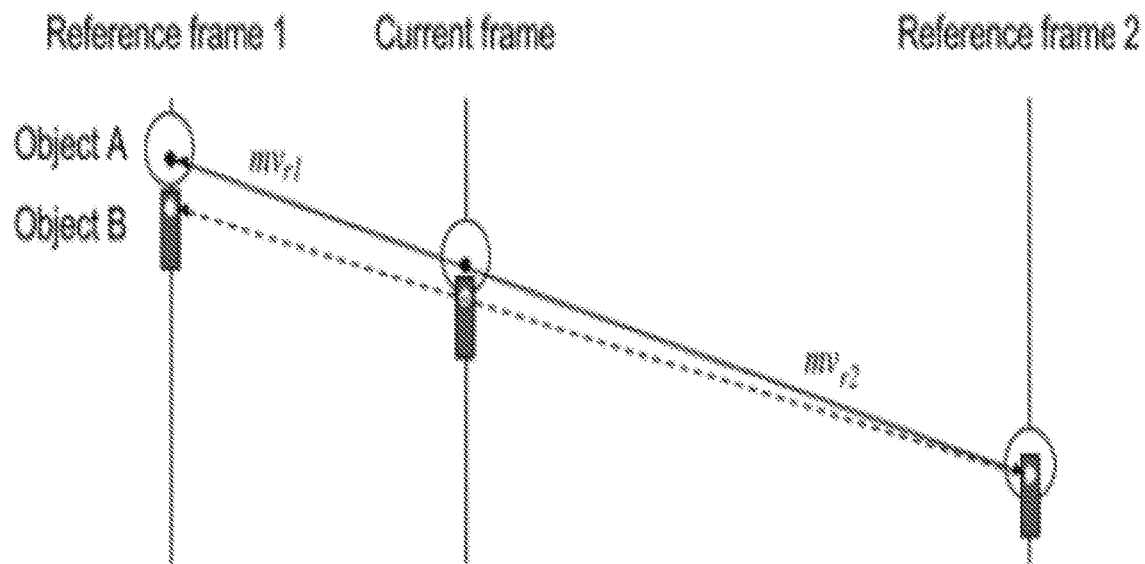
FIG. 13 is a diagram that illustrates object occlusion.

Generating an optical flow reference frame using the forward and backward reference frames at 1006 is next described with reference to FIGS. 11-13. Initially, optical flow estimation according to the teachings herein is described.

Optical flow estimation may be performed for respective pixels of the frame by minimizing the following Lagrangian function (1):

$$J = J_{data} + \lambda J_{spatial} \quad (1)$$

In the function (1), $J_{data}$ is the data penalty based on the brightness constancy assumption (i.e., the assumption that an intensity value of a small portion of an image remains unchanged over time despite a position change). $J_{spatial}$ is the spatial penalty based on the smoothness of the motion field (i.e., the characteristic that neighboring pixels likely belong to the same object item in an image, resulting in substantial the same image motion). The Lagrangian parameter $\lambda$ controls the importance of the smoothness of the motion field. A large value for the parameter $\lambda$ results in a smoother motion field and can better account for motion at a larger scale. In contrast, a smaller value for the parameter $\lambda$ may more effectively adapt to object edges and the movement of small objects.

According to an implementation of the teachings herein, the data penalty may be represented by the data penalty function:

$$J_{data} = (E_x u + E_y v + E_t)^2$$

The horizontal component of a motion field for a current pixel is represented by u, while the vertical component of the motion field is represented by v. Broadly stated, $E_x$, $E_y$, and $E_t$ are derivatives of pixel values of reference frames with respect to the horizontal axis x, the vertical axis y, and time t (e.g., as represented by frame indexes). The horizontal axis and the vertical axis are defined relative to the array of the pixels forming the current frame, such as the current frame 900, and the reference frames, such as the reference frames 1 and 2.

In the data penalty function, the derivatives $E_x$, $E_y$, and $E_t$ may be calculated according to the following functions (3), (4), and (5):

$$E_x = (index_{r2} - index_{cur}) \cdot E_x^{(r1)}/(index_{r2} - index_{r1}) + (index_{cur} - index_{r1}) \cdot E_x^{(r2)}/(index_{r2} - index_{r1}) \quad (3)$$

$$E_y = (index_{cur} - index_{r1}) \# E_y^{(r1)}/(index_{r2} - index_{r1}) + (index_{cur} - index_{r1}) \cdot E_y^{(r2)}/(index_{r2} - index_{r1}) \quad (4)$$

$$E_t = E^{(r2)} - E^{(r1)} \quad (5)$$

The variable $E^{(r1)}$ is a pixel value at a projected position in the reference frame 1 based on the motion field of the current pixel location in the frame being encoded. Similarly, the variable $E^{(r2)}$ is a pixel value at a projected position in the reference frame 2 based on the motion field of the current pixel location in the frame being encoded The variable $index_{r1}$ is the display index of the reference frame 1, where the display index of a frame is its index in the display order of the video sequence. Similarly, the variable $index_{r2}$ is the display index of the reference frame 2, and the variable $index_{cur}$ is the display index of the current frame 900.

The variable $E_x^{(r1)}$ is the horizontal derivative calculated at the reference frame 1 using a linear filter. The variable $E_x^{(r2)}$ is the horizontal derivative calculated at the reference frame 2 using a linear filter. The variable $E_x^{(r1)}$ is the vertical derivative calculated at the reference frame 1 using a linear filter. The variable $E_y^{(r2)}$ is the vertical derivative calculated at the reference frame 2 using a linear filter.

In an implementation of the teachings herein, the linear filter used for calculating the horizontal derivative is a 7-tap filter with filter coefficients [4/60, 9/60, −45/60, 0, 45/60, −9/60, 1/60]. The filter can have a different frequency profile, a different number of taps, or both. The linear filter used for calculating the vertical derivatives may be the same as or different from the linear filter used for calculating the horizontal derivatives.

The spatial penalty may be represented by the spatial penalty function:

$$J_{spatial} = (\Delta u)^2 + (\theta v)^2 \quad (3)$$

In the spatial penalty function (3), $\Delta u$ is the Laplacian of the horizontal component u of the motion field, and $\Delta v$ is the Laplacian of the vertical component v of the motion field.

Figure 11:
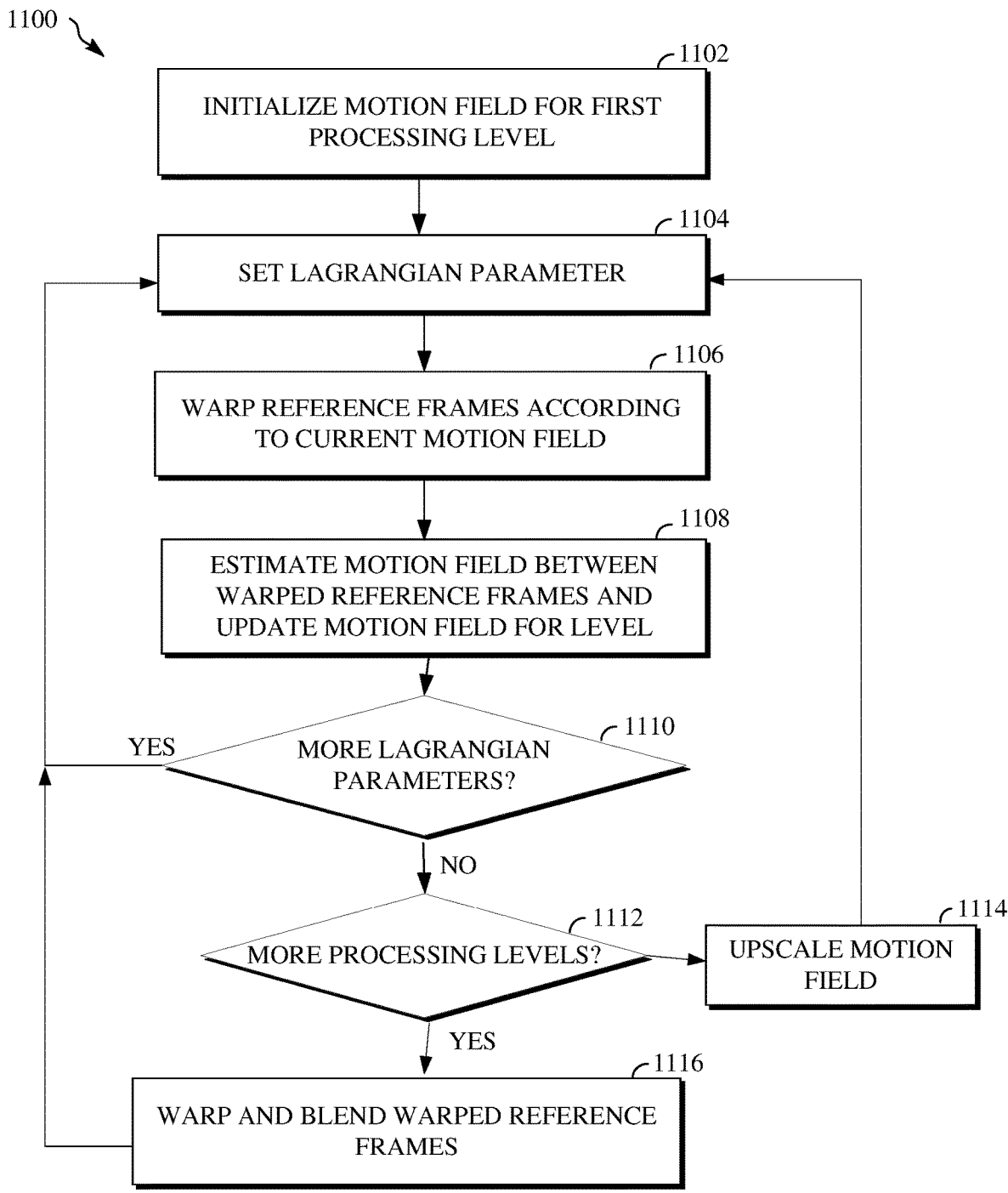
FIG. 11 is a flowchart diagram of a process for generating an optical flow reference frame.

FIG. 11 is a flowchart diagram of a method or process 1100 for generating an optical flow reference frame. The process 1100 can implement step 1006 of the process 1000. The process 1100 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 1100. The process 1100 can be implemented using specialized hardware or firmware. As described above, multiple processors, memories, or both, may be used.

Because the forward and backward reference frames can be relatively distant from each other, there may be dramatic motion between them, reducing the accuracy of the brightness constancy assumption. To reduce the potential errors in the motion of a pixel resulting from this problem, the estimated motion vectors from the current frame to the reference frames can be used to initialize the optical flow estimation for the current frame. At 1102, all pixels within the current frame are assigned an initialized motion vector. They define initial motion fields that can be utilized to warp the reference frames to the current frame for a first processing level to shorten the motion lengths between reference frames.

The motion field $mv_{cur}$ of a current pixel may be initialized using a motion vector that represents a difference between the estimated motion vector $mv_{r2}$ pointing from the current pixel to the backward reference frame, in this example reference frame 2, and the estimated motion vector $mv_{r2}$ pointing from the current pixel to the forward reference frame, in this example reference frame 1, according to:

$$mv_{cur} = -mv_{r1} + mv_{r2}$$

If one of the motion vectors is unavailable, it is possible to extrapolate the initial motion using the available motion vector according to one of the following functions:

$$mv_{cur} = -mv_{r1} \cdot (index_{r2} - index_{r1})/(index_{cur} - index_{r1}), \text{ or}$$

$$mv_{cur} = mv_{r2} \cdot (index_{r2} - index_{r1})/(index_{r2} - index_{cur}).$$

Where a current pixel has neither motion vector reference available, one or more spatial neighbors having an initialized motion vector may be used. For example, an average of the available neighboring initial motion vectors may be used.

In an example of initializing the motion field for a first processing level at 1102, reference frame 2 may be used to predict a pixel of reference frame 1, where reference frame 1 is the last frame before the current frame being coded. That motion vector, projected on to the current frame using linear projection in a similar manner as shown in FIG. 9, results in a motion field mv cur at the intersecting pixel location, such as the motion field 906 at the pixel location 902.

FIG. 11 refers to a first processing level because there are desirably multiple processing levels to the process 1100. This can be seen by reference to FIG. 12, which is a diagram that illustrates the process 1100 of FIG. 11. The following description uses the phrase motion field. This phrase is intended to collectively refer to the motion field for respective pixels unless otherwise clear from the context. Accordingly, the plural "motion fields" and "motion field" may be used interchangeably when referring to more than one motion field. Further, the phrase optical flow may be used interchangeably with the phrase motion field when referring to the movement of a single pixel.

To estimate the motion field/optical flow for pixels of a frame, a pyramid, or multi-layered, structure may be used. In one pyramid structure, for example, the reference frames are scaled down to one or more different scales. Then, the optical flow is first estimated to obtain a motion field at the highest level (the first processing level) of the pyramid, i.e., using the reference frames that are scaled the most. Thereafter, the motion field is upscaled and used to initialize the optical flow estimation at the next level. This process of upscaling the motion field, using it to initialize the optical flow estimation of the next level, and obtaining the motion field continues until the lowest level of the pyramid is reached (i.e., until the optical flow estimation is completed for the reference frames at full scale).

The reasoning for this process is that it is easier to capture large motion when an image is scaled down. However, using simple rescale filters for scaling the reference frames can degrade the reference frame quality. To avoid losing the detailed information due to rescaling, a pyramid structure that scales derivatives instead of the pixels of the reference frames to estimate the optical flow. This pyramid scheme represents a regressive analysis for the optical flow estimation. The scheme is shown in FIG. 12 and is implemented by the process 1100 of FIG. 11.

More specifically, at 1104, the Lagrangian parameter $\lambda$ is set for solving the Lagrangian function (1). Desirably, the process 1100 uses multiple values for the Lagrangian parameter $\lambda$. The first value at which the Lagrangian parameter $\lambda$ is set at 1104 may be a relatively large value, such as 100.

At 1106, the reference frames are warped to the current frame according to the motion field for the current processing level. Warping the reference frames to the current frame may be performed using subpixel location rounding. It is worth noting that the motion field $mv_{cur}$ that is used at the first processing level is downscaled from its full resolution value to the resolution of the level before performing the warping. Downscaling a motion field is discussed in more detail below.

Knowing the optical flow $mv_{cur}$, the motion field to warp reference frame 1 is inferred by the linear projection assumption (e.g., that the motion projects linearly over time) as follows:

$$mv_{r1} = (index_{cur} - index_{r1})/(index_{r2} - index_{r1}) mv_{cur}$$

To perform warping, the horizontal component $u_{r1}$ and the vertical component $u_{r1}$ of the motion field $mv_{r1}$ are rounded to ⅛ pixel precision for the Y component and 1/16 pixel precision for the U and V component. After rounding, each pixel in a warped image $E_{warped}^{(r1)}$ is calculated as the referenced pixel given by the motion vector $mv_{r1}$. Subpixel interpolation may be performed using a conventional subpixel interpolation filter.

The same warping approach is done for reference frame 2 to get a warped image $E_{warped}^{(r2)}$, where the motion field is calculated by:

$$MV_{r2} = (index_{r2} - index_{cur})/(index_{r2} - index_{r1}) mv_{cur}$$

At the end of the calculation at 1106, two warped reference frames exist. The two warped reference frames are used to estimate the motion field between them at 1108. Estimating the motion field at 1108 can include multiple steps.

First, the derivatives $E_x$, $E_y$, and $E_t$ are calculated using the functions (3), (4), and (5). Then, if there are multiple layers, the derivatives are downscaled to the current level. As shown in FIG. 12, the reference frames are used to calculate the derivatives at the original scale to capture details. The downscaled derivatives at each level 1 may be calculated by averaging within a $2^1$ by $2^1$ block. It is worth noting that, because calculating the derivatives as well as averaging them are both linear operations, the two operations may be combined in a single linear filter to calculate the derivatives at each level 1. This can lower complexity of the calculations.

Once the derivatives are downscaled to the current processing level, as applicable, optical flow estimation can be performed according to the Lagrangian function (1). More specifically, by setting the derivatives of the Lagrangian function (1) with respect to the horizontal component u of the motion field and the vertical component v of the motion field to zero (i.e., aJ/au=0 and aJ/av=0), the components u and v may be solved for all N pixels of a frame with 2*N linear equations. This results from the fact that the Laplacians are approximated by two-dimensional (2D) filters. Instead of directly solving the linear equations, which is accurate but highly complex, iterative approaches may be used to minimize the Lagrangian function (1) with faster but less accurate results.

At 1108, the motion field for the current frame is updated or refined using the estimated motion field between the warped reference frames. For example, the current motion field may be updated by adding the estimated motion field on a pixel-by-pixel basis.

Once the motion field is estimated at 1108, a query is made at 1110 to determine whether there are additional values for the Lagrangian parameter $\lambda$ available. Smaller values for the Lagrangian parameter $\lambda$ can address smaller scales of motion. If there are additional values, the process 1100 can return to 1104 to set the next value for the Lagrangian parameter $\lambda$. For example, the process 1100 can repeat while reducing the Lagrangian parameter $\lambda$ by half in each iteration. The motion field estimation estimated at 1108 is the current motion field for warping the reference frames at 1106 in this next iteration. Then, the motion field is again estimated at 1108. The processing at 1104, 1106, and 1108 continues until all of the possible Lagrangian parameters at 1110 are processed. In an example, there are three levels to the pyramid as shown in FIG. 12, so the smallest value for the Lagrangian parameter $\lambda$ is 25. This repeating processing while modifying the Lagrangian parameter may be referred to as annealing the Lagrangian parameter.

Once there are no remaining values for the Lagrangian parameter $\lambda$ at 1110, the process 100 advances to 1112 to determine whether there are more processing levels to process at 1112. If there are additional processing levels at 1112, the process advances to 1114, where the motion field is upscaled before processing the next layer using each of the available values for the Lagrangian parameter λ starting at 1104.

In general, the optical flow is first estimated to obtain a motion field at the highest level of the pyramid. Thereafter, the motion field is upscaled and used to initialize the optical flow estimation at the next level. This process of upscaling the motion field, using it to initialize the optical flow estimation of the next level, and obtaining the motion field continues until the lowest level of the pyramid is reached (i.e., until the optical flow estimation is completed for the derivatives calculated at full scale) at 1112.

Once the level is at the level where the reference frames are not downscaled (i.e., they are at their original resolution), the process advances to 1116. For example, the number of levels can be three, such as in the example of FIG. 12. At 1116, the warped reference frames are blended to form the optical flow reference frame $E^{(cur)}$. Note that the warped reference frames blended at 1116 may be the full-scale reference frames that are warped again according to the process described at 1106 using the motion field estimation estimated at 1108. In other words, the full-scale reference frames may be warped twice—once using the initial upscaled motion field from the previous layer of processing and again after the motion field is refined at the full-scale level. The blending may be performed using the time linearity assumption (e.g., that frames are spaced apart by equal time periods) as follows:

$$E^{(cur)} = E_{warped}^{(r1)} \cdot (\text{index}_{r2} - \text{index}_{cur})/(\text{index}_{r2} - \text{index}_{r1}) + E_{warped}^{(r2)} \cdot (\text{index}_{cur} - \text{index}_{r1})/(\text{index}_{r2} - \text{index}_{r1})$$

In some implementations, it is desirable to prefer the pixel in only one of the warped reference frames rather than the blended value. For example, if a reference pixel in the reference frame 1 (represented by $mv_{r1}$) is out of bound (e.g., outside of the dimensions of the frame) while the reference pixel in the reference frame 2 is not, then only the pixel in the warped image resulting from the reference frame 2 is used according to:

$$E^{(cur)} = E_{warped}^{(r2)}$$

Optional occlusion detection may be performed as part of the blending. Occlusion of objects and background commonly occurs in a video sequence, where parts of the object appear in one reference frame but are hidden in the other. Generally, the optical flow estimation method described above cannot estimate the motion of the object in this situation because the brightness constancy assumption is violated. If the size of the occlusion is relatively small, the smoothness penalty function may estimate the motion quite accurately. That is, if the undefined motion field at the hidden part is smoothed by the neighboring motion vectors, the motion of the whole object can be accurate.

Even in this case, however, the simple blending method described above may not give us satisfactory interpolated results. This can be demonstrated by reference to FIG. 13, which is a diagram that illustrates object occlusion. In this example, the occluded part of object A shows in reference frame 1 and is hidden by object B in reference frame 2. Because the hidden part of object A is not shown in reference frame 2, the referenced pixel from reference frame 2 is from object B. In this case, using only the warped pixel from the reference frame 1 is desirable. Accordingly, using a technique that detects occlusions, instead of or in addition to the above blending, may provide a better blending result, and hence a better reference frame.

Regarding detection of an occlusion, observe that when occlusion occurs and the motion field is fairly accurate, the motion vector of the occluded part of object A points to object B in reference frame 2. This may result in the following situations. The first situation is that the warped pixel values $E_{warped}^{(r1)}$ and $E_{warped}^{(r2)}$ are very different because they are from two different objects. The second situation is that the pixels in object B are referenced by multiple motion vectors, which are for object B in the current frame and for the occluded part of object A in the current frame.

With these observations, the following conditions may be established to determine occlusion and use of only $E_{warped}^{(r1)}$ for $E^{cur}$ where similar conditions apply for using only $E_{warped}^{(r1)}$ for $E^{cur}$:

$|E_{warped}^{(r1)} - E_{warped}^{(r2)}|$) is greater than a threshold T p and $N_{ref}^{(r2)}/N_{ref}^{(r1)}$ is greater than a threshold T ref.

$N_{ref}^{(r2)}$ is the total number of times that the referenced pixel in the reference frame 1 is referenced by any pixel in the current co-located frame. Given the existence of subpixel interpolation described above, $N_{ref}^{(r2)}$ is counted when the reference subpixel location is within one pixel length of the interested pixel location. Moreover, if $mv_{r2}$ points to a subpixel location, the weighted average of $N_{ref}^{(r2)}$ of the four neighboring pixels as the total number of references for the current subpixel location. $N_{ref}^{(r1)}$ is similarly defined.

Figure 14:
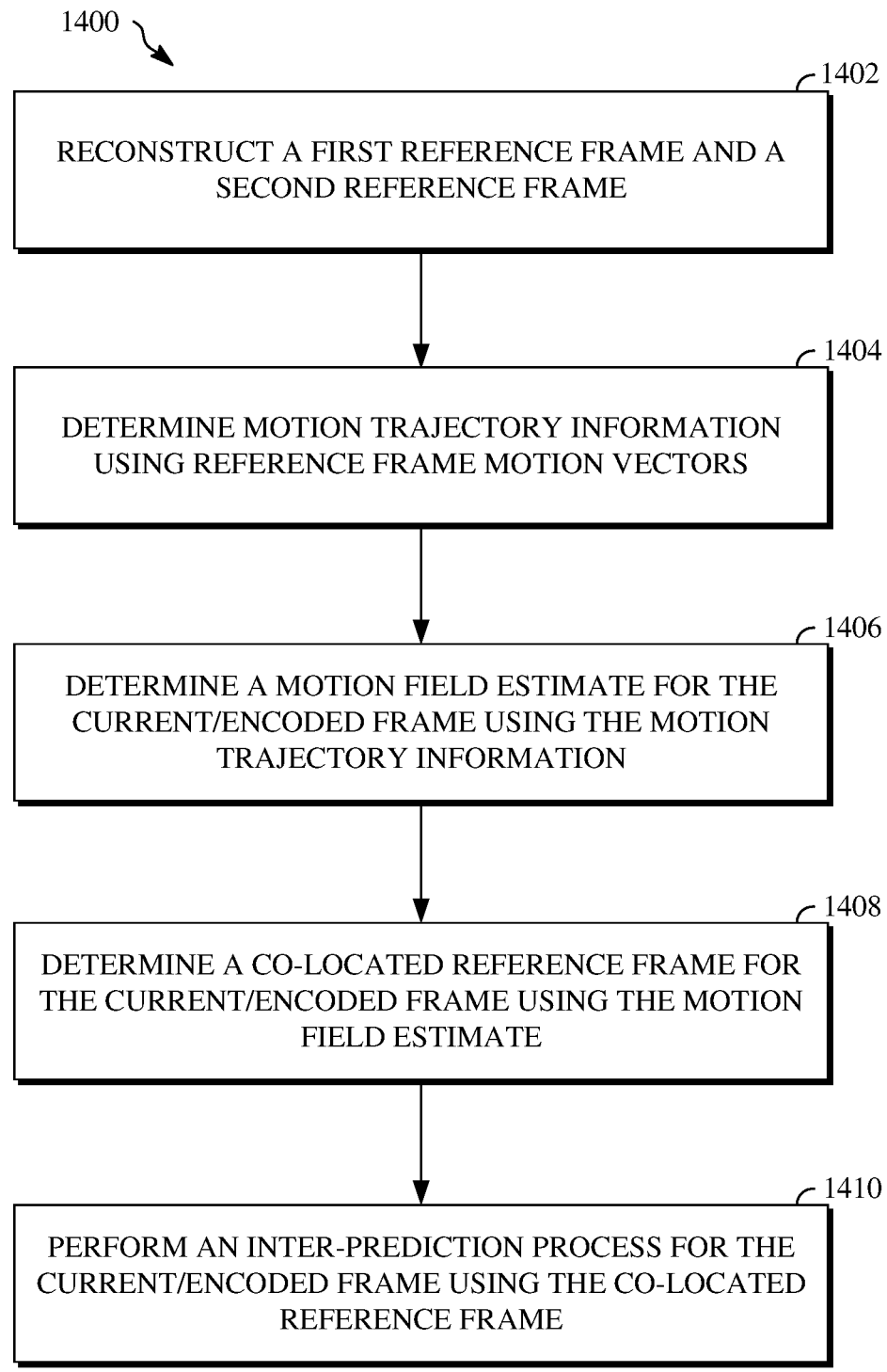
FIG. 14 is a flowchart diagram of a process for motion compensated prediction of a video frame using a co-located reference frame determined using motion field estimation.

Accordingly, an occlusion can be detected in the first reference frame using the first warped reference frame and the second warped reference frame. Then, the blending of the warped reference frames can include populating pixel positions of the optical flow reference frame corresponding to the occlusion with pixel values from the second warped reference frame. Similarly, an occlusion can be detected in the second reference frame using the first warped reference frame and the second warped reference frame. Then, the blending of the warped reference frames can include populating pixel positions of the optical flow reference frame corresponding to the occlusion with pixel values from the first warped reference frame FIG. 14 is a flowchart diagram of a process 1400 for motion compensated prediction of a video frame using a co-located reference frame determined using motion field estimation. The process 1400 can be implemented, for example, as a software program that may be executed by computing devices such as transmitting station 102 or receiving station 106. For example, the software program can include machine-readable instructions that may be stored in a memory such as the memory 204 or the secondary storage 214, and that, when executed by a processor, such as CPU 202, may cause the computing device to perform the process 1400. The process 1400 can be implemented using specialized hardware or firmware. Some computing devices may have multiple memories or processors, and the operations described in the process 1400 can be distributed using multiple processors, memories, or both.

The process 1400 may be performed during an encoding process, such as performed using the encoder 400 shown in FIG. 4, or during a decoding process, such as performed using the decoder 500 shown in FIG. 5. For example, when performed during an encoding process, the process 1400 may be partially performed as part of a reconstruction loop of an encoder, such as using the dequantization stage 410, the inverse transform stage 412, the reconstruction stage 414, and/or the loop filtering stage 416 shown in FIG. 4, as well as using a prediction stage of the encoder, such as using the intra/inter prediction stage 402 shown in FIG. 4. In such a case, information used for the prediction may be derived from the reconstruction loop of the encoder.

In another example, when performed during a decoding process, the process 1400 may be performed using conventional aspects of a decoder used to reconstruct reference frames and perform prediction against an encoded frame, such as the entropy decoding stage 502, the dequantization stage 504, the inverse transform stage 506, the reconstruction stage 510, and the intra/inter prediction stage 508 shown in FIG. 5. In such a case, information used for the prediction may be derived from a bitstream to which the reference frames and encoded frame are encoded, such as the compressed bitstream 420 shown in FIGS. 4-5.

At 1402, a first reference frame and a second reference frame are reconstructed. When the process 1400 is performed at an encoder, reconstructing the first and second reference frames may include at least dequantizing, inverse transforming, and then reconstructing the reference frames from respective quantized transform coefficients processed at the encoder. When the process 1400 is performed at a decoder, reconstructing the first and second reference frames may include at least dequantizing, inverse transforming, and then reconstructing the reference frames from reference frame data encoded to a bitstream.

At 1404, motion trajectory information is determined using motion vectors of the first reference frame and the second reference frame. The motion trajectory information includes concatenated motion vectors produced by concatenating motion vectors of the first reference frame and motion vectors of the second reference frame. The concatenated motion vectors form a trajectory which intersects the first reference frame, the second reference frame, and the current/encoded frame. The motion trajectory information further includes indications of locations of the frame being encoded or decoded at which those concatenated motion vectors point. In some implementations, the motion vectors of the first reference frame and/or of the second reference frame may be signaled within the bitstream.

Concatenating motion vectors of the first reference frame and motion vectors of the second reference frame may include interpolating motion vectors using motion vectors of a first set of motion vectors associated with the first frame and motion vectors of a second set of motion vectors associated with the second frame, extrapolating motion vectors using motion vectors of the first set of motion vectors and motion vectors of the second set of motion vectors, or otherwise joining motion vectors of the first set of motion vectors and motion vectors of the second set of motion vectors.

For example, a first motion vector may point from a location within a first reference frame and a second motion vector may point from that location within the first reference frame to a location within the current or encoded frame. Those first and second motion vectors may be joined and directly used as a motion trajectory for the current or encoded frame. Thus, the motion trajectory information may indicate a motion trajectory according to those first and second motion vectors.

Figure 15:
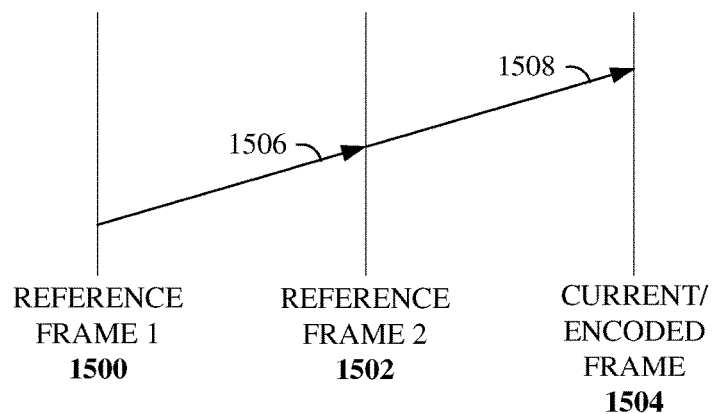
FIG. 15 is a diagram used to explain a first example of motion vector concatenation according to the teachings herein.

FIG. 15 illustrates an example of motion vector concatenation between a first reference frame 1500, a second reference frame 1502, and a current/encoded frame 1504, in which a first motion vector 1506 points from a location within the first reference frame 1500 to a location within the second reference frame 1502 and a second motion vector 1508 points from that same location within the second reference frame 1502 to a location within the current/encoded frame 1504. For example, the second motion vector 1508 may be an already available motion vector, such as where the second motion vector 1508 was previously derived. For example, the second motion vector 1508 may have been previously derived using the second reference frame 1502 and a third reference frame (not shown). The second motion vector 1508, after derivation, may thus be projected to the current/encoded frame 1504. A motion vector resulting from concatenating the first motion vector 1506 and the second motion vector 1508 may be used as the motion trajectory for the current/encoded frame 1504. Thus, the motion trajectory information for the current/encoded frame 1504 indicates a motion trajectory according to the first motion vector 1506 and the second motion vector 1508.

In some implementations, the current/encoded frame 1504 may be located in between the first reference frame 1500 and the second reference frame 1502. In such a case, where a motion vector points from a location within the first reference frame 1500 across the current/encoded frame 1504 to a location within the second reference frame 1502, that motion vector may be directly used as the motion trajectory for the current/encoded frame 1504. In such an implementation, because a single motion vector is directly used as the motion trajectory information, the determination of the motion trajectory information may be performed without concatenating motion vectors.

In another example, the motion trajectory information may be determined using more than two reference frames. For example, a third reference frame may be reconstructed, and motion vectors of the third reference frame may be concatenated along with motion vectors of each of the first and second reference frames to determine the motion trajectory information. In such a case, motion vectors each pointing between two of the more than two reference frames may be interpolated or extrapolated to determine interpolated motion vectors or extrapolated motion vectors, as the case may be.

Figure 16:
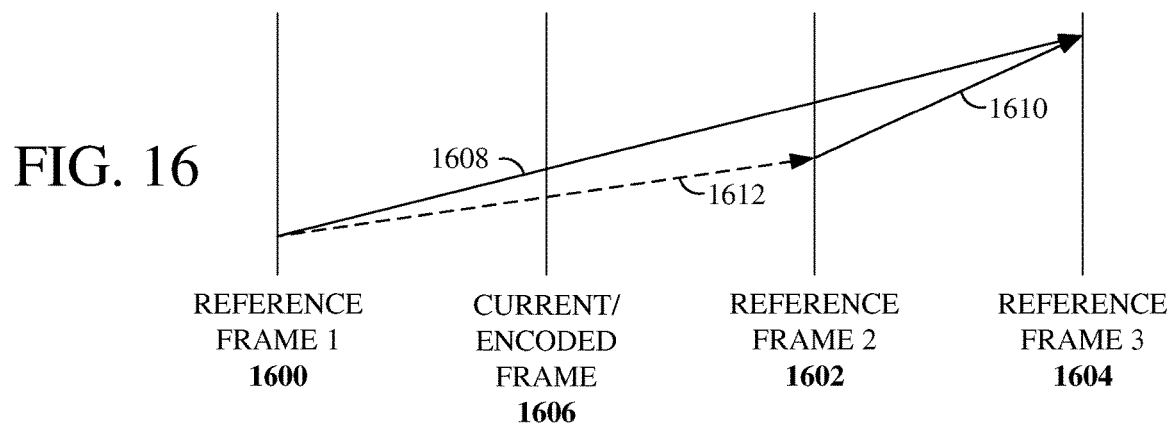
FIG. 16 is a diagram used to explain a second example of motion vector concatenation according to the teachings herein.

FIG. 16 illustrates an example of motion vector concatenation between a first reference frame 1600, a second reference frame 1602, a third reference frame 1604, and a current/encoded frame 1606, in which a first motion vector 1608 points from a location within the first reference frame 1600 to a location within the third reference frame 1604 and a second motion vector 1610 points from a location within the second reference frame 1602 to that same location within the third reference frame 1604. An interpolated motion vector 1612 pointing between the first reference frame 1600 and the second reference frame 1602 may be determined by interpolating between the first motion vector 1608 and the second motion vector 1610. The interpolated motion vector 1612 may be used as the motion trajectory for the current/encoded frame 1606. In some implementations, where the current/encoded frame is not in between the reference frames, an extrapolated motion vector may instead be determined.

At 1406, a motion field estimate for the frame undergoing encoding or decoding is determined using the motion trajectory information. The motion field estimate is a two-dimensional array of motion vectors. The motion field estimate is determined using the motion trajectory information by placing motion vectors concatenated from motion vectors of the first and second reference frames within certain locations of the motion field estimate. For example, the location within the motion field estimate of a motion vector may be based on a pixel to which the motion vector points within the frame being encoded or decoded.

In some implementations, one or more motion vectors may be unavailable at locations of the motion field estimate.

For example, a motion vector may be missing or omitted from the motion field estimate, such as because it was not derived from pixels of the reference frames. In some such implementations, an unavailable motion vector may be interpolated using one or more neighboring motion vectors within the motion field estimate. For example, motion derived from pixels neighboring a co-located location within the first reference frame and the second reference frame may be interpolated to derive a motion vector. The derived motion vector may then be represented at the corresponding location of the motion field estimate.

In some such implementations, the one or more neighboring motion vectors may be weighted according to a relative importance for interpolating the previously unavailable motion vector. For example, weights can be determined for motion vector interpolation for the motion field estimate, in which motion vectors having greater weights are considered to be more important for use in interpolating an unavailable motion vector. The relative importance of a neighboring motion vector may be based on one or more aspects including, but not limited to, a magnitude and/or direction of the neighboring motion vector on its own or relative to other neighboring motion vectors, similarities between pixel intensities at co-located pixels of the reference frames, or the like.

At 1408, a co-located reference frame for the frame undergoing encoding or decoding is determined using the motion field estimate. The co-located reference frame may be directly interpolated using the motion field estimate. For example, determining the co-located reference frame may include interpolating motion information using the motion field estimate and pixel information using the first reference frame and the second reference frame.

In some implementations, when the motion trajectory information indicates a non-linear motion trajectory, the co-located reference frame may be used to adjust an offset between the first reference frame and the second reference frame. For example, the motion vector 1612 shown in FIG. 16 is linearly projected to determine a motion field estimate for the current/encoded frame 1606. This may assume that an object corresponding to that motion moves in constant velocity and direction. However, it may be the case that the motion of that object actually curves. In such a case, an extra step of inter prediction may be performed to correct for potential offsets from the actual motion trajectory to the linear projection of the motion vector 1612. In some such implementations, a motion model (e.g., translational, affine, homographic, warped, etc.) may be used for this purpose.

At 1410, an inter-prediction process is performed for the frame undergoing encoding or decoding using the co-located reference frame. In particular, the inter-prediction process may be performed using a motion vector derived from the co-located reference frame, such as described below. The prediction process can include generating a prediction block from a reference block of the co-located reference frame and using a motion vector associated with that reference block. In some implementations, generating the prediction block in either an encoder or a decoder can include selecting the reference block or a co-located block, to the extent different, in the co-located reference frame as the prediction block. The prediction process at 1410 may be repeated for all blocks of the frame undergoing encoding or decoding until the frame is encoded or decoded.

In an encoder, generating the prediction block can include performing a motion search within the co-located reference frame to select the best matching prediction block for the current block. In a decoder, generating the prediction block can include using a motion vector derived from the motion field estimate to generate the prediction block using pixels of the co-located reference frame. However the prediction block is generated at the encoder, the resulting residual can be further processed, such as using the lossy encoding process described with regard to the encoder 400 of FIG. 4. However the prediction block is generated at the decoder, the decoded residual for the current block from the encoded bitstream can be combined with the prediction block to form a reconstructed block as described by example with regard to the decoder 500 of FIG. 5.

At an encoder, the process 1400 may form part of a rate distortion loop for the current block that uses various prediction modes, including one or more intra prediction modes and both single and compound inter prediction modes using the available prediction frames for the current frame. A single inter prediction mode uses only a single forward or backward reference frame for inter prediction. A compound inter prediction mode uses both a forward and a backward reference frame for inter prediction. In a rate distortion loop, the rate (e.g., the number of bits) used to encode the current block using respective prediction modes is compared to the distortion resulting from the encoding. The distortion may be calculated as the differences between pixel values of the block before encoding and after decoding. The differences can be a sum of absolute differences or some other measure that captures the accumulated error for blocks of the frames.

In some implementations, the motion vector derived for the inter-prediction process may be derived according to a quality measurement evaluated for the motion vector. For example, quality measurements may be evaluated for multiple motion vectors of a pixel of the co-located reference frame. The motion vector used for the inter-prediction process may thus derived responsive to determining that the quality measurement evaluated for the motion vector is a highest one of the quality measurements.

For example, each motion vector represented within the motion field estimate may have a quality measurement. The quality measurement may be determined in one or more ways including, but not limited to, based on a difference between associated reference blocks, smoothness with respect to neighbor motion vectors, or the like. If the quality of a motion vector within the motion field estimate is low, such as based on a defined value range or a threshold comparison, the motion vector may be less useful for the inter-prediction process performed for the frame undergoing encoding or decoding.

Further, in some such implementations, where pixels may be associated with multiple motion vectors, a ranking may be performed based on the quality measurement of the motion vectors to select the best available motion vector within the motion field estimate, which will be the motion vector derived from the motion field estimate and used for the inter-prediction process performed for the frame undergoing encoding or decoding. In some such implementations, some or all of the motion vectors within the motion field estimate may be weighted based on their respective quality measurements. In some cases, the weighting may be used for the ranking, such as to select the best available motion vector.

In some implementations, the process 1400, when performed during decoding, may further include decoding, from the bitstream, one or more syntax elements indicating whether to determine the motion field estimate using motion vector information of one or more reference frames. For example, the one or more syntax elements may be encoded at the frame-level, including to a frame header of the encoded frame being decoded. In such a way, the decision on whether to determine a motion field estimate for a given frame as set forth in the process 1400 may be signaled within the bitstream. In some such implementations, the motion trajectory information is determined at 1404 responsive to the one or more syntax elements indicating to determine the motion field estimate using the motion vector information. Thus, in such a case, the process 1400 continues to 1404, and then eventually to 1406, 1408, and 1410.

However, responsive to the one or more syntax elements not indicating to determine the motion field estimate using the motion vector information, the process 1400 may instead proceed to decode the encoded frame using an optical flow reference frame generated based on an optical flow estimation of the encoded frame, the first reference frame, and the second reference frame. The optical flow reference fame may be determined and the optical flow estimation may be performed as disclosed herein, for example, with respect to the process 1000 and the process 1100, respectively of FIGS. 10-11.

In some implementations, the process 1400 may omit determining the co-located reference frame. In particular, in some such implementations, a motion vector may be derived directly from the motion field estimate and used for the inter-prediction process at 1410. some such implementations, where the motion trajectory of concatenated motion vectors intersecting the first reference frame, the second reference frame, and the current/encoded frame is non-linear, the co-located reference frame may still be determined, such as to adjust an offset between the first reference frame and the second reference frame.

In some implementations, the motion field estimate may be used for purposes beyond deriving a motion vector for performing the inter-prediction process described at 1410. For example, in such cases, the motion field estimate may be used for motion vector prediction.

For simplicity of explanation, each of the processes 1000, 1100, and 1400 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition, or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A non-transitory computer readable medium having stored thereon an encoded bitstream, wherein the encoded bitstream is configured for decoding by operations comprising:
   determining a concatenated motion vector representing a motion trajectory intersecting a current frame, a first reference frame of the current frame, and a second reference frame of the current frame by concatenating one or more motion vectors signaled within the encoded bitstream and associated with the first reference frame and the second reference frame;
   determining a motion field estimate for decoding the current frame using the concatenated motion vector;
   interpolating a co-located reference frame for decoding the current frame using motion information from the motion field estimate and pixel information from the first reference frame and the second reference frame, wherein the co-located reference frame is co-located with the current frame; and
   performing an inter-prediction process for decoding the current frame using a motion vector derived from the co-located reference frame.

2. The non-transitory computer readable medium of claim 1, wherein determining the concatenated motion vector comprises:
   concatenating a first motion vector pointing from the first reference frame toward the second reference frame and a second motion vector pointing from the second reference frame toward the current frame, wherein the motion trajectory corresponds to the first motion vector and the second motion vector, and wherein the second motion vector is previously derived between the second reference frame and a third reference frame.

3. The non-transitory computer readable medium of claim 1, wherein determining the concatenated motion vector comprises:
   determining an interpolated motion vector from a first motion vector pointing from the first reference frame toward a third reference frame and a second motion vector pointing from the second reference frame toward the third reference frame, wherein the motion trajectory corresponds to the interpolated motion vector.

4. The non-transitory computer readable medium of claim 1, further comprising:
   evaluating a quality measurement of the motion vector; and
   deriving the motion vector based on the evaluating.

5. The non-transitory computer readable medium of claim 4, wherein quality measurements are evaluated for multiple motion vectors of a pixel of the co-located reference frame, wherein the motion vector is derived responsive to determining that the quality measurement evaluated for the motion vector is a highest one of the quality measurements.

6. The non-transitory computer readable medium of claim 1, wherein determining the motion field estimate for decoding the current frame using the concatenated motion vector comprises:
   responsive to determining that a given motion vector is unavailable at a location of the motion field estimate, interpolating the given motion vector using one or more neighboring motion vectors within the motion field estimate.

7. The non-transitory computer readable medium of claim 6, wherein the one or more neighboring motion vectors are weighted according to a relative importance for interpolating the given motion vector.

8. The non-transitory computer readable medium of claim 1, further comprising:
   decoding one or more syntax elements indicating whether to determine the motion field estimate using motion vector information of one or more reference frames, wherein the concatenated motion vector is determined responsive to the one or more syntax elements indicating to determine the motion field estimate using the motion vector information.

9. The non-transitory computer readable medium of claim 8, further comprising:
   responsive to determining that the one or more syntax elements do not indicate to determine the motion field estimate using the motion vector information, performing the inter-prediction process for decoding the current frame using an optical flow reference frame generated based on an optical flow estimation of the current frame, the first reference frame, and the second reference frame.

10. The non-transitory computer readable medium of claim 9, wherein the optical flow estimation is performed by minimizing a Lagrangian function for respective pixels of the first reference frame.

11. A non-transitory computer readable medium having stored thereon an encoded bitstream, wherein the encoded bitstream is configured for decoding by operations comprising:
    determining a concatenated motion vector representing a motion trajectory intersecting a current frame, a first reference frame of the current frame, and a second reference frame of the current frame by concatenating motion vectors signaled within the bitstream and associated with the first reference frame and the second reference frame;
    interpolating a co-located reference frame for decoding the current frame using motion information from a motion field estimate determined based on the concatenated motion vector and using pixel information from the first reference frame and the second reference frame, wherein the co-located reference frame is co-located with the current frame; and
    performing an inter-prediction process for decoding the current frame using a motion vector derived using the co-located reference frame.

12. The non-transitory computer readable medium of claim 11, wherein interpolating the co-located reference frame comprises:
    determining the motion field estimate using the concatenated motion vector; and
    determining the co-located reference frame by interpolating the motion information using the motion field estimate.

13. The non-transitory computer readable medium of claim 12, further comprising:
    using the motion field estimate for motion vector prediction.

14. The non-transitory computer readable medium of claim 11, wherein, when the motion trajectory is a non-linear motion trajectory, the co-located reference frame is used to adjust an offset between the first reference frame and the second reference frame.

15. The non-transitory computer readable medium of claim 11, wherein the motion vectors associated with the first reference frame and the second reference frame include one or more motion vectors associated with the first reference frame and one or more motion vectors associated with the second reference frame.

16. A non-transitory computer readable medium having stored thereon an encoded bitstream, wherein the encoded bitstream is configured for decoding by operations comprising:
  determining a motion field estimate for decoding a current frame using a concatenated motion vector determined by concatenating motion vectors signaled within the encoded bitstream and associated with a first reference frame of the current frame and a second reference frame of the current frame, the concatenated motion vector representing a motion trajectory intersecting the first reference frame, the second reference frame, and the current frame;
  interpolating a co-located reference frame for decoding the current frame using motion information from the motion field estimate and pixel information from the first reference frame and the second reference frame, wherein the co-located reference frame is co-located with the current frame; and
  performing an inter-prediction process for decoding the current frame using a motion vector derived using the co-located reference frame.

17. The non-transitory computer readable medium of claim 16, wherein determining the motion field estimate for decoding the current frame using the concatenated motion vector comprises:
  determining the concatenated motion vector by concatenating one or more motion vectors of a first set of motion vectors between the first reference frame and the current frame and one or more motion vectors of a second set of motion vectors between the second reference frame and the current frame.

18. The non-transitory computer readable medium of claim 17, wherein the concatenated motion vector is determined by concatenating the one or more motion vectors of the first set of motion vectors, the one or more motion vectors of the second set of motion vectors, and one or more motion vectors of a third set of motion vectors between the current frame and a third reference frame.

19. The non-transitory computer readable medium of claim 16, wherein interpolating a co-located reference frame comprises:
  interpolating the co-located reference frame directly from the motion field estimate using the first reference frame and the second reference frame.

20. The non-transitory computer readable medium of claim 16, wherein the co-located reference frame is used to adjust an offset between the first reference frame and the second reference frame.

* * * * *